US011448060B2

(12) United States Patent
Batarseh

(10) Patent No.: US 11,448,060 B2
(45) Date of Patent: Sep. 20, 2022

(54) METHOD AND SYSTEM FOR MONITORING AND PREVENTING HYDRATE FORMATIONS

(71) Applicant: SAUDI ARABIAN OIL COMPANY, Dhahran (SA)

(72) Inventor: Sameeh Issa Batarseh, Dhahran Hills (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 280 days.

(21) Appl. No.: 16/833,429

(22) Filed: Mar. 27, 2020

(65) Prior Publication Data

US 2021/0301650 A1 Sep. 30, 2021

(51) Int. Cl.
*G01N 29/11* (2006.01)
*G01N 29/44* (2006.01)
(Continued)

(52) U.S. Cl.
CPC ............ *E21B 47/107* (2020.05); *B08B 9/027* (2013.01); *B08B 17/00* (2013.01);
(Continued)

(58) Field of Classification Search
CPC .. E21B 47/107; E21B 47/0025; E21B 47/006; E21B 41/0099; E21B 43/32;
(Continued)

(56) References Cited

U.S. PATENT DOCUMENTS 5,998,681 A 12/1999 Rojey
10,277,094 B2 4/2019 Batarseh et al.
(Continued)

FOREIGN PATENT DOCUMENTS

CN 101608118 B 7/2012
CN 202746940 U 2/2013
(Continued)

OTHER PUBLICATIONS da Silva, Jaidilson Jóat al., "Development of Circuits for Excitation and Reception in Ultrasonic Transducers for Generation of Guided Waves in Hollow Cylinders for Fouling Detection", Transactions on Instrumentation and Measurement, IEEE, vol. 57, No. 6, Jun. 2008, pp. 1149-1153 (5 pages).
(Continued)

*Primary Examiner* — Suman K Nath
(74) *Attorney, Agent, or Firm* — Osha Bergman Watanabe & Burton LLP

(57) ABSTRACT

A method for monitoring hydrate formation in an interior of a tube may include deploying a first hydrate controller device at a first location on an exterior surface of the tube. The method may include deploying a second hydrate controller device at a second location on the exterior surface of the tube. The method may include transmitting, by the first hydrate controller device, first acoustic signals towards the interior of the tube. The first acoustic signals may include a first frequency value and a first amplitude value associated to a transmission power level. The method may include receiving, by the second hydrate controller device, the first acoustic signals. The method may include measuring, by the second hydrate controller device, a reception power level of the first acoustic signals.

20 Claims, 11 Drawing Sheets

(51) Int. Cl.
| | |
|---|---|
| *E21B 47/107* | (2012.01) |
| *E21B 47/002* | (2012.01) |
| *E21B 41/00* | (2006.01) |
| *B08B 9/027* | (2006.01) |
| *B08B 17/00* | (2006.01) |
| *G01N 29/04* | (2006.01) |
| *E21B 43/32* | (2006.01) |

(52) U.S. Cl.
CPC ...... *E21B 41/0099* (2020.05); *E21B 47/0025* (2020.05); *G01N 29/041* (2013.01); *G01N 29/11* (2013.01); *G01N 29/4427* (2013.01); *G01N 29/4445* (2013.01); *E21B 43/32* (2013.01)

(58) Field of Classification Search
CPC ...... B08B 9/027; B08B 17/00; G01N 29/041; G01N 29/11; G01N 29/4427; G01N 29/4445; G01N 29/225; G01N 29/265; G01N 29/346; G01N 29/348; G01N 2291/102; G01N 2291/0258; G01N 2291/2634
See application file for complete search history.

(56) References Cited

U.S. PATENT DOCUMENTS

| | | | |
|---|---|---|---|
| 11,028,561 B2* | 6/2021 | Azzouni | E03B 3/06 |
| 2003/0033870 A1 | 2/2003 | Shah et al. | |
| 2006/0254766 A1 | 11/2006 | Richard et al. | |
| 2010/0324839 A1 | 12/2010 | Martin | |
| 2011/0011576 A1 | 1/2011 | Cavender et al. | |
| 2011/0239769 A1 | 10/2011 | Schmitt et al. | |
| 2011/0303012 A1 | 12/2011 | Amundsen et al. | |
| 2015/0367387 A1 | 12/2015 | Alcuri et al. | |
| 2016/0279684 A1 | 9/2016 | Lund | |
| 2016/0370325 A1 | 12/2016 | Yusuf et al. | |
| 2017/0074447 A1 | 3/2017 | Batarseh et al. | |
| 2019/0240708 A1 | 8/2019 | Saltykov et al. | |

FOREIGN PATENT DOCUMENTS

| | | |
|---|---|---|
| CN | 101906293 B | 6/2013 |
| CN | 102383766 B | 11/2013 |
| CN | 208885200 U | 5/2019 |
| EP | 2796870 A1 | 10/2014 |
| RU | 2137908 C1 | 9/1999 |
| RU | 2140519 C1 | 10/1999 |
| RU | 2148151 C1 | 4/2000 |
| RU | 2327855 C2 | 6/2008 |
| WO | 2008024035 A2 | 2/2008 |
| WO | 2019120261 A1 | 6/2019 |

OTHER PUBLICATIONS

Ahmad, Talha J. et al., "Ultrasound Tomography Based Two-Phase Composition Measurement", SPE-193317-MS, Society of Petroleum Engineers, Nov. 2018, pp. 1-6 (6 pages).

Salehi, I.A. et al., "Seismic Imaging for Site Selection and Monitoring of Carbon Dioxide Sequestration Part 2-Field Studies", Gas TIPS, Hart Energy Publishing, LP, vol. 12, No. 1, Winter 2006, pp. 2-4 (3 pages).

International Search Report issued in corresponding International Application No. PCT/US2020/030233, dated Nov. 27, 2020 (4 pages).

Written Opinion issued in corresponding International Application No. PCT/US2020/030233, dated Nov. 27, 2020 (9 pages).

* cited by examiner

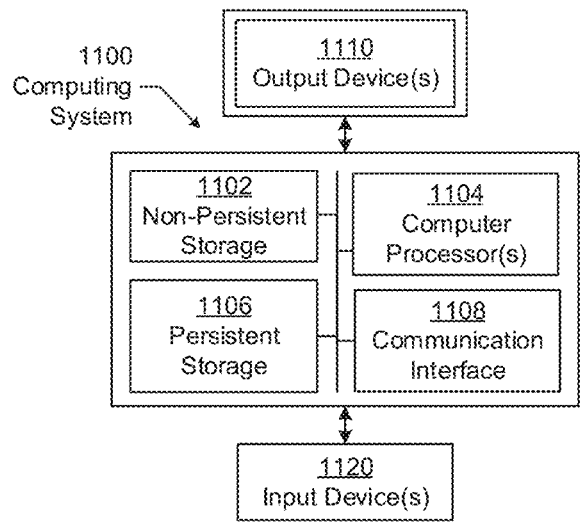
FIG. 11.1
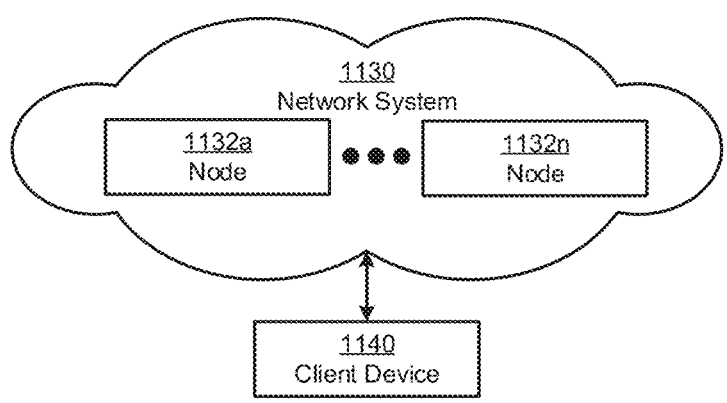
FIG. 11.2

METHOD AND SYSTEM FOR MONITORING AND PREVENTING HYDRATE FORMATIONS

BACKGROUND

A hydrate occurs when a substance is chemically combined with water. A substance may chemically combine with water inside a tube through temperature changes to form crystalline water-based solids. Hydrates may be ice droplets causing blockage and slow down in a tube. Hydrates occur when temperature drops to less than 70° F. with respect to a respective pressure increase in an area. Hydrates cause major issues as tubes may be completely or partially filled with ice formations causing blockages and/or backlogs in the tubes. Possible deposition of hydrates within tubes may occur in conditions at high pressure and low temperature. In oil and gas applications, hydrate problems are found during normal multiphase flow of oil/water/gas, and in transient operations. Such conditions allow a continuous formation of the hydrates that accumulate within tubes during oil production, which can reduce the amount of flow within a passage of the tubes and ultimately reduce the overall rate of oil production. Hydrates can also plug downhole tubing, tree, manifold piping, and other flow equipment. Such plugs within the tubes are difficult to locate and remove, which also lead to significant losses in oil production and revenue.

SUMMARY

In general, in one aspect, embodiments disclosed herein relate to a method for monitoring hydrate formation in an interior of a tube. The method includes deploying a first hydrate controller device at a first location on an exterior surface of the tube. The method includes deploying a second hydrate controller device at a second location on the exterior surface of the tube. The method includes transmitting, by the first hydrate controller device, first acoustic signals towards the interior of the tube. The first acoustic signals include a first frequency value and a first amplitude value associated with a transmission power level. The method includes receiving, by the second hydrate controller device, the first acoustic signals. The method includes measuring, by the second hydrate controller device, a reception power level of the first acoustic signals. The method includes obtaining, by the second hydrate controller device, a power level difference from comparing the transmission power level to the reception power level. The method includes determining, by the second hydrate controller device, a hydrate formation probability in the interior of the tube based on the power level difference.

In general, in one aspect, embodiments disclosed herein relate to a system for monitoring hydrate formation in an interior of a tube. The system includes a first hydrate controller device deployed at a first location on an exterior surface of the tube. The system includes a second hydrate controller device deployed at a second location on the exterior surface of the tube. The first hydrate controller device transmits first acoustic signals towards the interior of the tube and the first acoustic signals include a first frequency value and a first amplitude value associated with a transmission power level. The second hydrate controller device receives the first acoustic signals, measures a reception power level of the first acoustic signals, and obtains a power level difference from comparing the transmission power level to the reception power level. The second hydrate controller device determines a hydrate formation probability in the interior of the tube based on the power level difference.

In general, in one aspect, embodiments disclosed herein relate to a hydrate controller device deployed at a first location on an exterior surface of a tube for monitoring hydrate formation in an interior of the tube. The hydrate controller device includes sensing systems that receive acoustic signals from a second hydrate controller device deployed at a second location on the exterior surface of the tube. The second hydrate controller device transmits the acoustic signals towards the interior of the tube. The acoustic signals include a first frequency value and a first amplitude value associated with a transmission power level. The hydrate controller device includes processing systems that measure a reception power level of the acoustic signals. The processing systems obtain a power level difference from comparing the transmission power level to the reception power level and determine a hydrate formation probability in the interior of the tube based on the power level difference.

The foregoing general description and the following detailed description are exemplary of the invention and are intended to provide an overview or framework for understanding the nature of the invention as it is claimed. The accompanying drawings are included to provide further understanding of the invention and are incorporated in and constitute a part of the specification. The drawings illustrate various embodiments of the invention and together with the description serve to explain the principles and operation of the invention.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

FIGS. 11.1 and 11.2 show a computer system in accordance with one or more embodiments.

DETAILED DESCRIPTION

Figure 1:
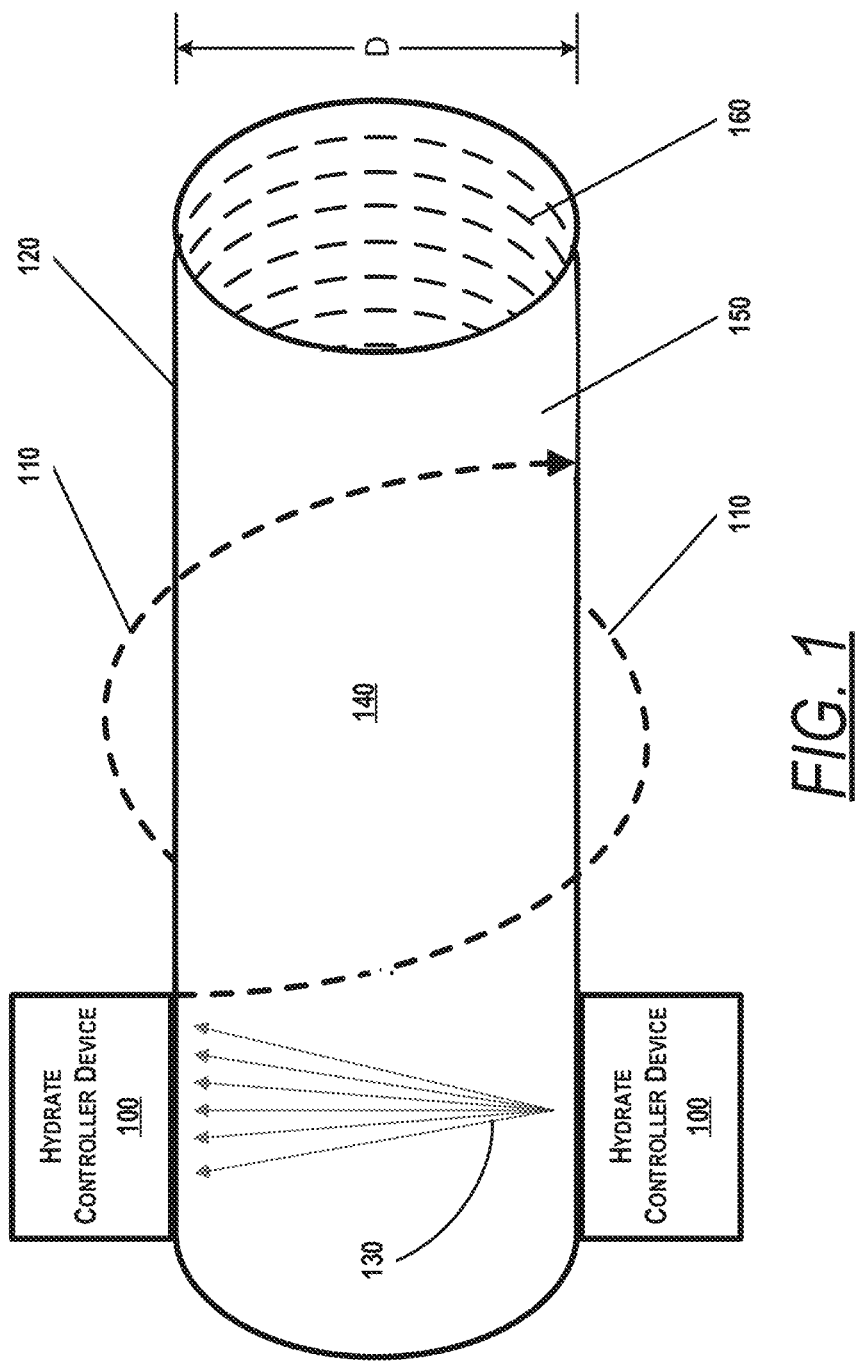
FIG. 1 shows a schematic view of a hydrate monitoring system in accordance with one or more embodiments.

In the following detailed description, certain specific details are set forth in order to provide a thorough understanding of various disclosed implementations and embodiments. However, one skilled in the relevant art will recognize that implementations and embodiments may be practiced without one or more of these specific details, or with other methods, components, materials, and so forth. In other instances, well known features or processes associated with the hydrocarbon production systems have not been shown or described in detail to avoid unnecessarily obscuring descriptions of the implementations and embodiments. For the sake of continuity, and in the interest of conciseness, same or similar reference characters may be used for same or similar objects in multiple figures.

In one or more embodiments, a system and a method to prevent hydrate formation within tubes are disclosed herein. The aforementioned method may prevent the formation of hydrates by introducing hydrate controller devices that use acoustic signals to monitor, prevent, and remove hydrates in the tubes. The hydrate prevention method includes deploying at least two hydrate controller devices that are configured for transmitting and receiving acoustic signals, and exchanging acoustic signals between the deployed hydrate controller devices to resonate the inside of the tube or pipelines to detach obstructions attached on the inner surface of the tubes. The hydrate controller devices can be placed at one end of the tubes, then the devices can be moved to different locations using their own mobile mechanism, or alternatively, can be dispatched by a use of a hoisting device that is designed to deliver the hydrate controller devices to a desired location.

In one example, hydrate controller devices may be transported along the outer surface of a tube, while maintaining specific positions and angles with respect to each other. Specifically, a pair of hydrate controller devices may be placed on the sides of the tube opposite to each other in order to maintain an allowable range for transmitting and receiving acoustic signals. Alternatively, a pair of hydrate controller devices may follow a helical path while maintaining the positions with respect to one another. Another example of a path line of the hydrate controller devices during transportation may be a straight or circular path line.

The hydrate controller devices may include a communication system that includes at least one antenna coupled to a transmitter and a receiver for exchanging acoustic signals. The transmitter and the receiver are configured to alter the frequency of the acoustic signals being exchanged between the hydrate controller devices based on the desired operation. For example, a relatively high range of frequency may be used to monitor, detect, or image obstructions within tubes while a relatively low range of frequency may be used to detach such obstructions. The hydrate controller devices may further include a processing system and a sensing system to process the signals from the communication system in order to determine an operation to perform among monitoring, imaging, and detaching. Hydrate controller devices in accordance with some other embodiments may have an integrated operation of both monitoring, imaging, and detaching hydrate formation within pipes.

FIG. 1 shows a schematic representation of two hydrate controller devices exchanging acoustic signals through a tube. Two hydrate controller devices may map an inside area 140 of the tube 150 to identify blockage in the tube 150. As described above, blockage may have the form of hydrates attached to interior walls 160 of the tube 150. The hydrate controller devices may exchange acoustic signals 130 to resonate the inside area 140 and to determine imaging information for mapping an inside of the tube 150. Further, upon identifying blockage in the inside area 140, the hydrate controller devices may exchange acoustic signals 130 to resonate the inside area 140 and to remove blockage.

In one or more, the tube 150 may be made out of metal, and it may include an exterior surface 120 and an interior surface 140. The exterior surface 120 and the interior surface 140 may delimit a thickness of the tube 150. In the tube 150, two hydrate controller devices (i.e., devices) may be deployed at parallel planes with respect to one another such that a distance separating the devices may be equal to a diameter D of the tube 150 including the thickness of the tube 150. A hydrate controller device 100 may include movement mechanisms that fasten the hydrate controller device 100 to the tube 150. Further, each hydrate controller device 100 may include a sensing element that may generate and identify acoustic signals 130. In this case, one hydrate controller device 100 may generate acoustic signals 130 to be dispersed though the inside area 140 of the tube 150 and towards the other hydrate controller device 100. As each hydrate controller device 100 is located at diametrically opposed locations, the acoustic signals 130 leave the sensing element of the one hydrate controller device 100 towards the sensing element of the other hydrate controller device 100.

A hydrate controller device 100 may move along the exterior surface 120 of the tube 150. In this case, each hydrate controller device 100 may maintain a predetermined distance with respect to one another during traversal. A traversal path 110 may follow any direction along the tube 150 while maintaining a distance between the hydrate controller devices to be equal to the diameter D of the tube 150. The distance is maintained as the hydrate controller devices move along the traversal path 110. To preserve the integrity of the of the imaging information, the traversal path 110 may be helical or circular as the hydrate controller devices move on the exterior surface 120.

Figure 2:
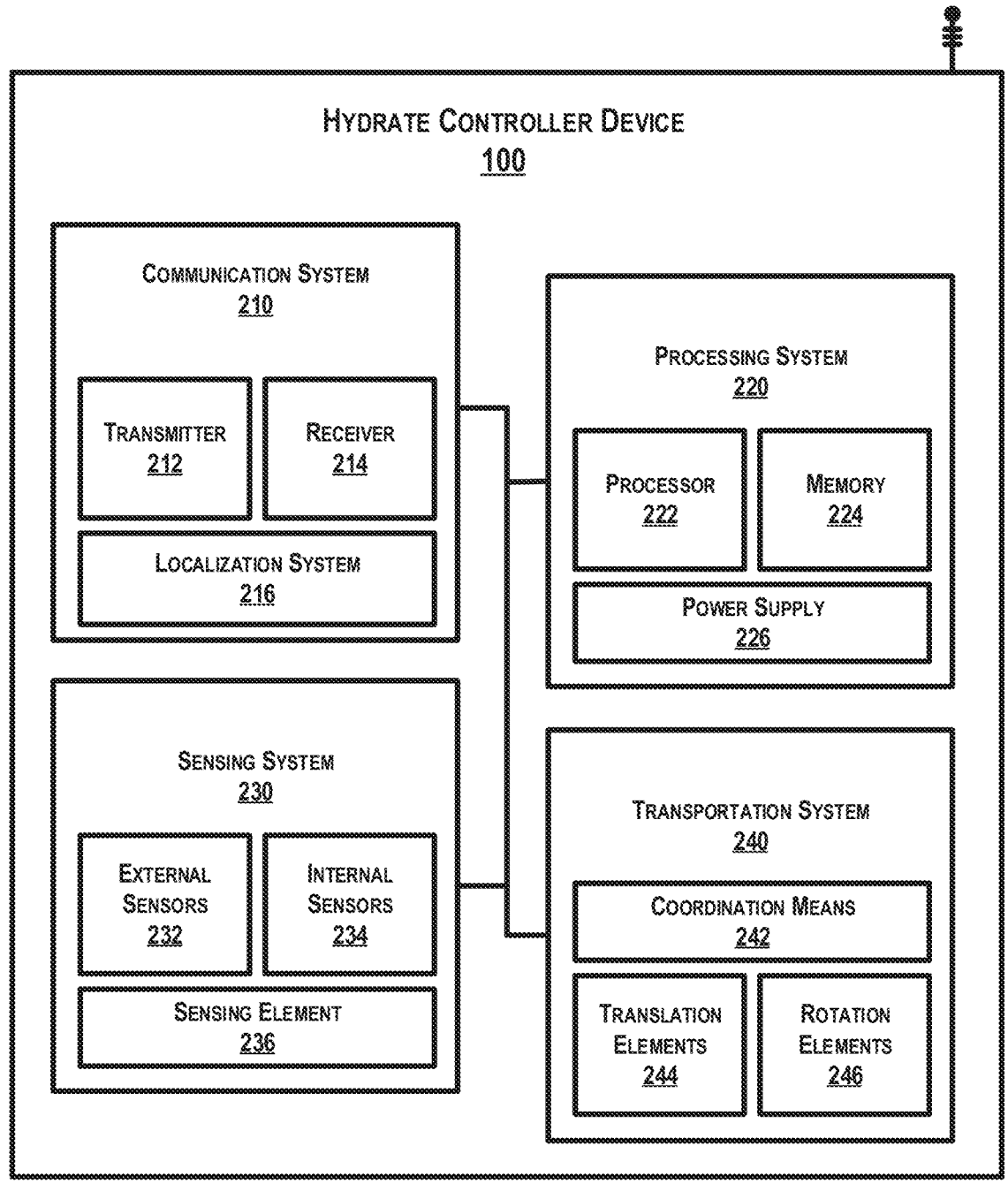
FIG. 2 shows a schematic view of the hydrate controller device in accordance with one or more embodiments.

FIG. 2 shows a schematic including different components of a hydrate controller device 100. The hydrate controller device 100 may include communication systems 210, processing system 220, sensing system 230, and transportation system 240. The communication system 210 may include a transmitter 212, a receiver 214, and localization system 216. The transmitter 212 and the receiver 214 may transmit and receive communication signals, respectively. Specifically, the transmitter 212 and the receiver 214 may communicate with one or more hydrate controller devices located in the tube or control system deployed at a remote location. The transmitter 212 and the receiver 214 may communicate wirelessly using a wide range of frequencies. In particular, high or ultrahigh frequencies (i.e., between 10 KHz to 10 GHz) may be implemented. The localization system 216 may include one or more geospatial location identification components that collect information associated with a geospatial location of the hydrate controller device 100.

The processing system 220 may include a processor 222, a memory 224, and a power supply 226. The power supply 226 may be a battery or wired connection for providing electrical energy to the hydrate controller device 100. In some embodiments, the battery may be charged using electrical connectors (not shown). The processor 222 may perform computational processes simultaneously and/or sequentially. The processor 222 may determine information to be transmitted and processes to be performed using information received. Similarly, the processor 222 may control collection and exchange of geospatial information through the localization system 216.

The sensing system 230 may include external sensors 232, internal sensors 234, and a sensing element 236. The external sensors 232 may be sensors that collect physical data from the environment surrounding the hydrate controller device 100. The internal sensors 234 may be sensors that collect physical data from the hydrate controller device 100. The external sensors 232 and the internal sensors 234 may be lightweight sensors requiring a small footprint. These sensors may exchange information with each other and supply it to the processor 222 for analysis. The sensing element 236 may be a pulse generator, a pulse receiver or a combination of both. The sensing element 236 may release acoustic signals through a pulse generated at a sensing portion. The sensing element 236 may collect acoustic signals generated through a pulse via a sensing portion. The processor 222 may identify trends, characteristics or properties (i.e., such as transmission/reception power levels) relating to the acoustic signals. The power supply 226 may be operationally connected to the sensing system 230 and including obtaining means (not shown) for collecting energy and producing electrical energy as a result. For example, the obtaining means may include solar panels collecting solar energy.

The transportation system 240 may include coordination means 242, translation elements 244, and rotation elements 246. The translation elements 244 and the rotation elements 246 may be mechanisms that move and rotate the hydrate controller device 100 in a three-dimensional (3D) space, respectively. The coordination mean 242 may be hardware and/or software configured to determine a movement of the hydrate controller device 100. The coordination means 242 may be mechanisms that prevent the hydrate controller device 100 from moving too fast along the traversal path 110. The coordination means 242 may control the translation elements 244 and the rotation elements 246 such that movement is controlled by the processor 222. The transportation system 240 may include transportation means including magnetic belts, wheels, and electric motors for rotating the wheels. The transportation means may include movement mechanisms that fasten the hydrate controller device 100 to the exterior surface of the tube 150.

Figure 3:
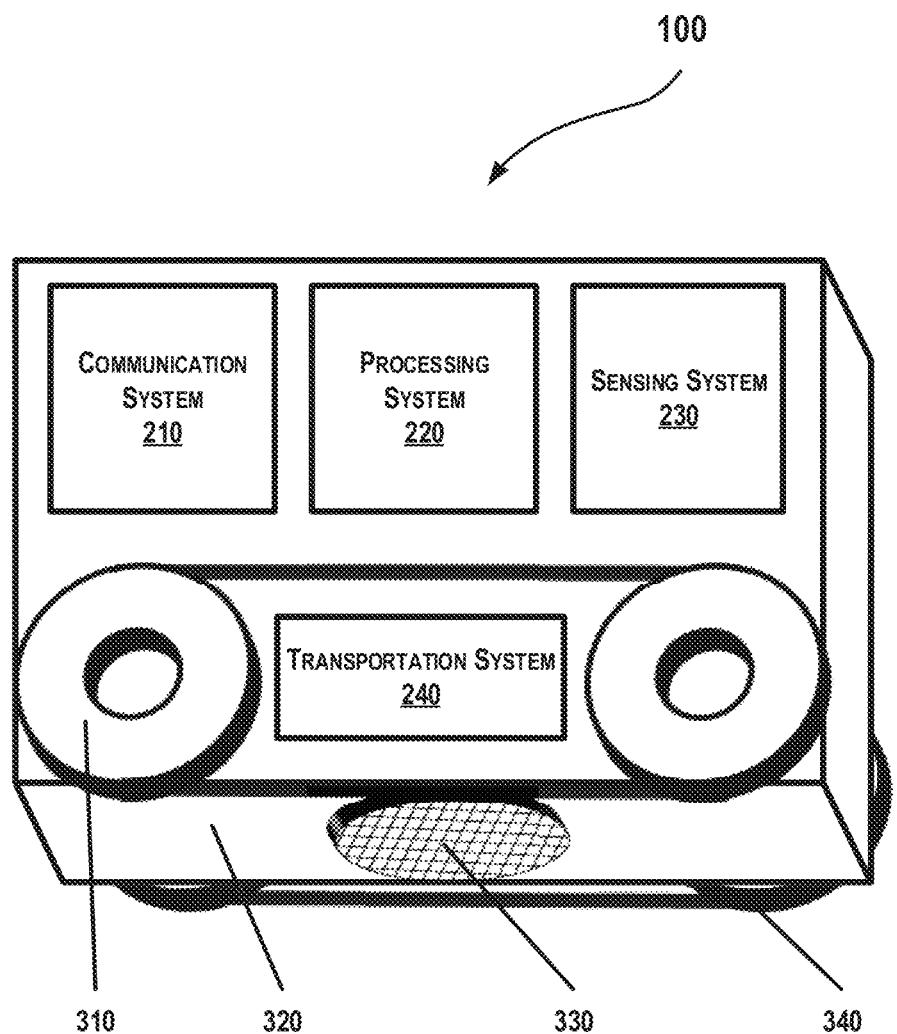
FIG. 3 shows a hydrate controller device in accordance with one or more embodiments.

FIG. 3 shows a hydrate controller device 100 in accordance with one or more embodiments. The hydrate controller device 100 may include the communication system 210, the processing system 220, the sensing system 230, and the transportation system 240 described with respect to FIG. 2. In some embodiments, the transportation system may include the transportation means described in FIG. 2. The transportation means may include wheels 310, belts 340, a housing 320, and a sensing port 330. The wheels 310 and the belts 340 may be disposed on each side of the hydrate controller device 100. The belts 340 may be integrally secured onto the outer surface of the wheels 310 by use of interlocking interface or adhesives between the belts 340 and the wheels 310. The belts 340 and the wheels 310 may be secured together such that wheels 310 on one side of the hydrate controller device 100 are coupled to rotate together. Wheels 310 on one side of the hydrate controller device 100 may be coupled with wheels 310 on the other side of the hydrate controller device 100 through a motor shaft (not shown), which couples all the wheels 310 of the hydrate controller device 100.

In some embodiments, the belts 340 may include magnetic material in order to provide magnetic force that retains the position of the controller device 100 on a desired location or path line. Additionally, magnetic rails may be installed on the outer surface of the tube and magnetization devise may be installed in the transportation means to ensure the hydrate controller devices 100 to follow a correct path line. The sensing portion 330 may be connected to the sensing system 230 for providing ease of transmission for the acoustic signals 130 into the tube 150. The sensing portion 330 may be part of a housing 320 made of a material capable of undergoing extreme weather conditions.

Figure 4:
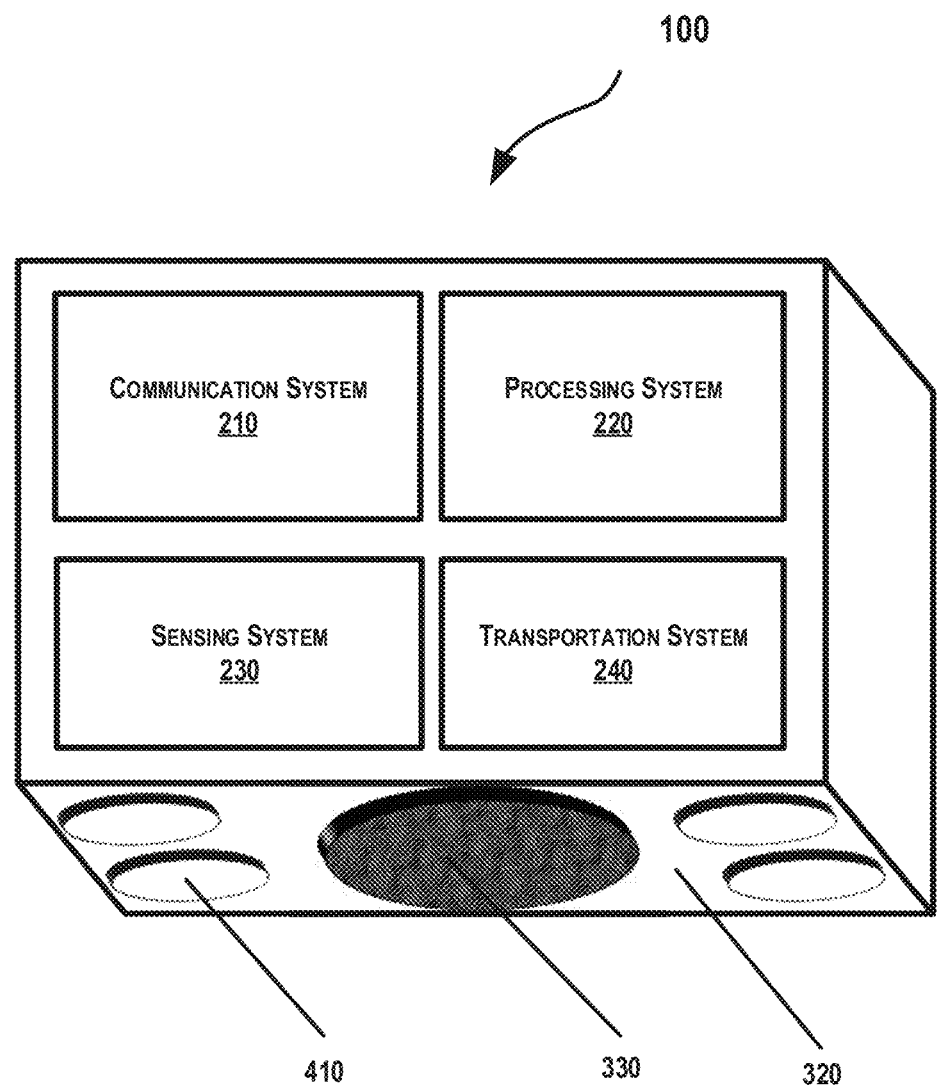
FIG. 4 shows a hydrate controller device in accordance with one or more embodiments.

FIG. 4 shows a hydrate controller device 100 in accordance with one or more embodiments. The hydrate controller device 100 may include the communication system 210, the processing system 220, the sensing system 230, and the transportation system 240 described with respect to FIG. 2. In some embodiments, the transportation system may include the transportation means described in FIG. 2. The transportation means may include attachments 410, a housing 520, and a sensing port 530. The attachments 410 may be fastening elements (i.e., adhesives, screws, clamps, or rivets for fixing the hydrate controller device 100 on a desired location.

Figure 5:
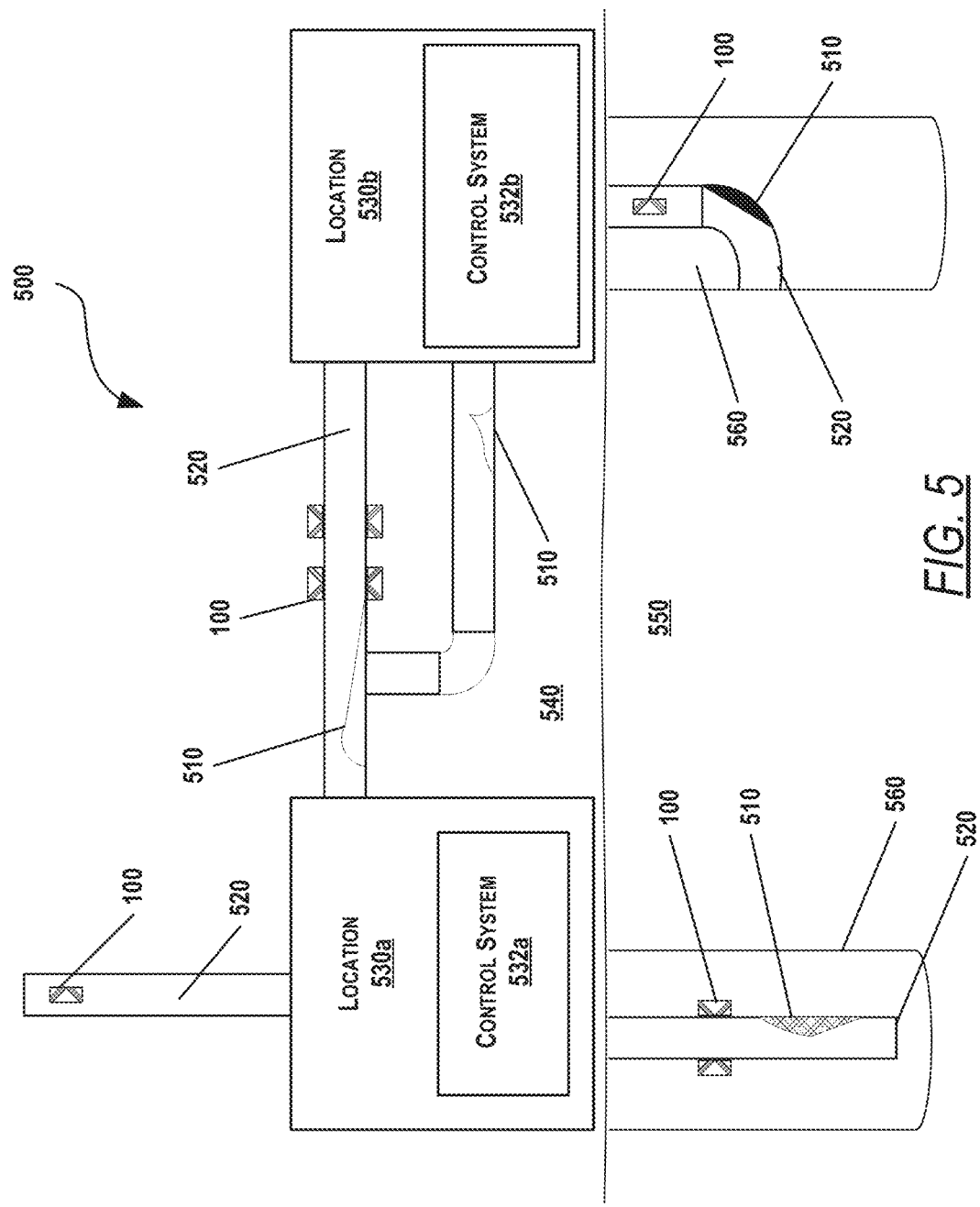
FIG. 5 shows an example of a hydrate controller device application in accordance with one or more embodiments.

FIG. 5 shows an example of a hydrate controller device application on a pipeline environment 500. As described above, a pair of hydrate controller devices 100 may be deployed on a tube. The tube may be a section of a pipeline 520 which may be on a surface area 540 or on a sub-surface area 550. In this case, the pipeline 520 may extend between one or more surface locations (i.e., location 530*a* and location 530*b*) or inside a single subterranean location 560. The pipeline 520 may have one or more sections in which hydrates 510 may be formed. Hydrates 510 in this example, represent hydrates as discussed in the previous FIGS. 1-4 and any sediment or condensation accumulated therein. Pairs of hydrate controller devices 100 may be deployed in sets of two (i.e., four hydrate controller devices traveling in close proximity). The pairs of hydrate controller devices 100 may travel in constant communication sending wireless communications to control system (i.e., control system 532*a* and control system 532*b*) which may be the control system as discussed in FIGS. 1-4.

Figure 6:
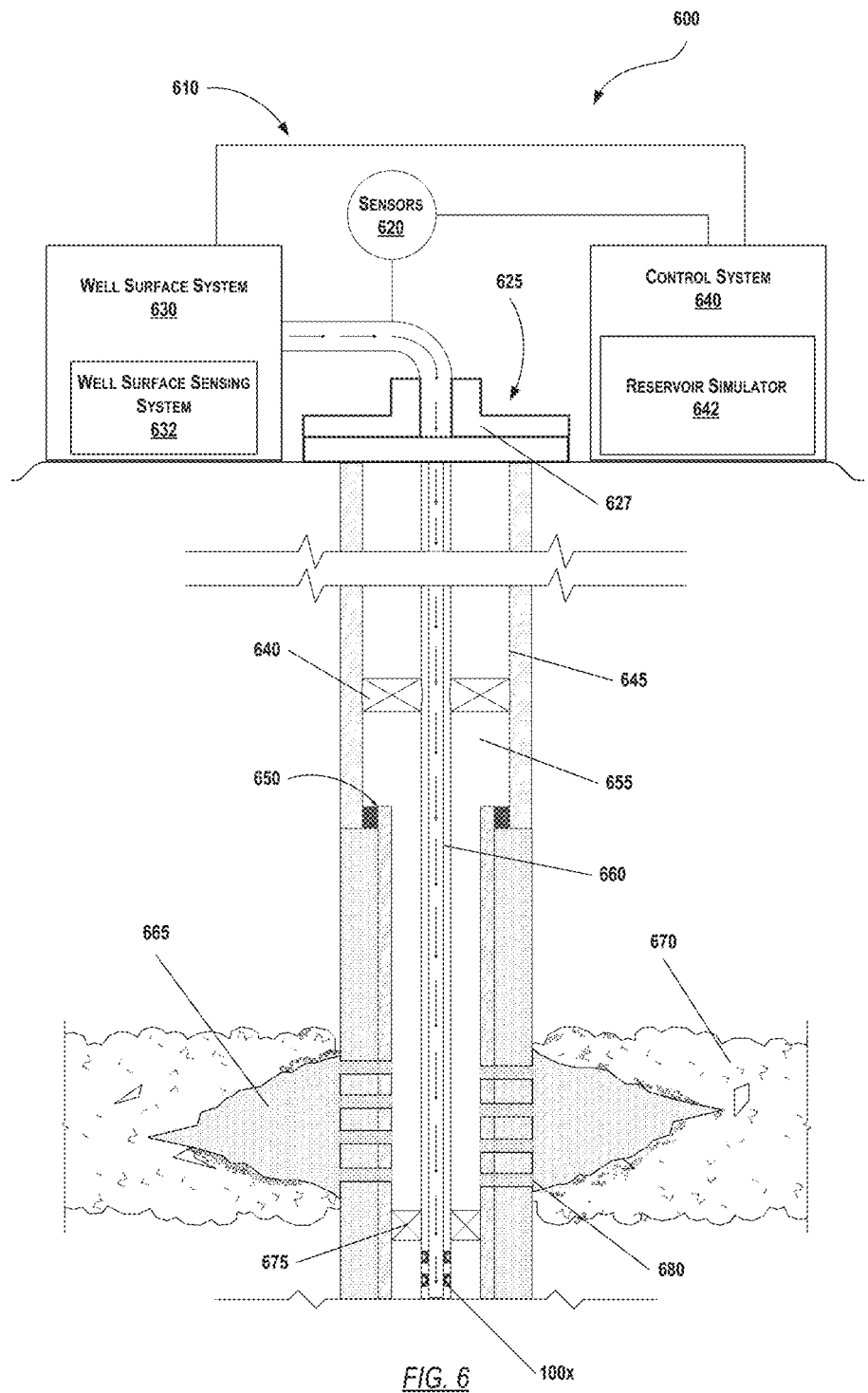
FIG. 6 shows an example of a hydrate controller device application in accordance with one or more embodiments.

FIG. 6 shows an example of a hydrate controller device application on a wellbore environment 600. As described above, the pair of hydrate controller devices 100 may be deployed on a tube. The tube may be a section of a wellbore tubular, for example a central casing 660. a schematic diagram illustrating a well environment 600 that includes a reservoir located in a subsurface formation ("formation") 670 and a well system 610. The formation 670 may include a porous or fractured rock formation 665 that resides underground, beneath Earth's surface ("surface"), and in connection to the wellbore 645 through one or more perforations 680. In the case of the well system 610 being a hydrocarbon well, the reservoir may include a portion of the formation 670 that includes a subsurface pool of hydrocarbons, such as oil and gas. The formation 670 and a reservoir may include different layers of rock having varying characteristics, such as varying degrees of permeability, porosity, and resistivity. In the case of the well system 610 being operated as a production well, the well system 610 may facilitate the extraction of hydrocarbons (or "production") from the reservoir.

In some embodiments, the well system 610 includes a wellbore 445, a well sub-surface system 635, a well surface system 630, and a well control system ("control system")

640. The control system 640 may control various operations of the well system 610, such as well production operations, well completion operations, well maintenance operations, and reservoir monitoring, assessment and development operations. In some embodiments, the control system 640 includes a computer system that is the same as or similar to that of computer system 1100 described below in FIGS. 11.1 and 11.2 and the accompanying description.

The wellbore 645 extends from the surface into a target zone of the formation 670, such as the reservoir. The wellbore 645 may facilitate the circulation of drilling fluids during drilling operations, the flow of hydrocarbon production ("production") (e.g., oil and gas) from the reservoir to the surface during production operations, the injection of substances (e.g., water) into the formation 670 or the during injection operations, or the communication of monitoring devices (e.g., logging tools) into the formation 670 or the reservoir during monitoring operations (e.g., during in situ logging operations).

In some embodiments, during operation of the well system 610, the control system 640 collects and records wellhead data for the well system ("well") 610. The wellhead data may include, for example, a record of measurements of wellhead pressure (Pwh) (e.g., including flowing wellhead pressure), wellhead temperature (Twh) (e.g., including flowing wellhead temperature), wellhead production rate (Qwh) over some or all of the life of the well system 610, and water cut data. In some embodiments, the measurements are recorded in real-time, and are available for review or use within seconds, minutes or hours of the condition being sensed (e.g., the measurements are available within 1 hour of the condition being sensed). In such an embodiment, the wellhead data may be referred to as "real-time" wellhead data. Real-time wellhead data may enable an operator of the well system 610 to assess a relatively current state of the well system 610, and make real-time decisions regarding development of the well system 610 and the reservoir, such as on-demand adjustments in regulation of production flow from the well.

In some embodiments, the well surface system 630 includes a wellhead 625. The wellhead may include structures 627 for supporting (or "hanging") casing and production tubing extending into the wellbore 645. Production may flow through the wellhead, after exiting the wellbore 645, including, for example, the casing and the production tubing. In some embodiments, the well surface system 630 includes flow regulating devices that are operable to control the flow of substances into and out of the wellbore 645. For example, the well surface system 630 may include one or more production valves that are operable to control the flow of production. For example, a production valve may be fully opened to enable unrestricted flow of production from the wellbore 645.

The well surface system 630 includes a well surface sensing system 632. The well surface sensing system 632 may be coupled to sensors 620 for sensing characteristics of substances, including production, passing through or otherwise located in the well surface system 630. The characteristics may include, for example, pressure, temperature and flow rate of production flowing through the wellhead 625, or other conduits of the well surface system 630, after exiting the wellbore 645.

The well control system 640 includes a reservoir simulator 642. For example, the reservoir simulator 642 may include hardware and/or software with functionality for generating one or more reservoir models regarding the formation 670 and/or performing one or more reservoir simulations. For example, the reservoir simulator 642 may perform mappings of the inside of a tube based on feedback received from the hydrate controller devices. For example, the reservoir simulator 642 may generate a three-dimensional (3D) representation of a topology of the inside of the central casing 660. Further, the reservoir simulator 642 may store well logs and data regarding core samples for performing simulations. While the reservoir simulator 642 is shown at a well site, embodiments are contemplated where reservoir simulators are located away from well sites. In some embodiments, the reservoir simulator 642 may include a computer system that is similar to the computer system 1100 described below with regard to FIGS. 11.1 and 11.2 and the accompanying description.

In one or more embodiments, the control system 640 may maintain a wireless connection with the hydrate controller devices 100. The control system 640 may provide coordinating signals to indicate a movement speed and direction to the hydrate controller devices 100. The control system 640 may receive feedback information from the hydrate controller devices. The feedback information may include resonance information describing a difference in acoustic signals exchanged between the hydrate controller devices 100.

Figure 7:
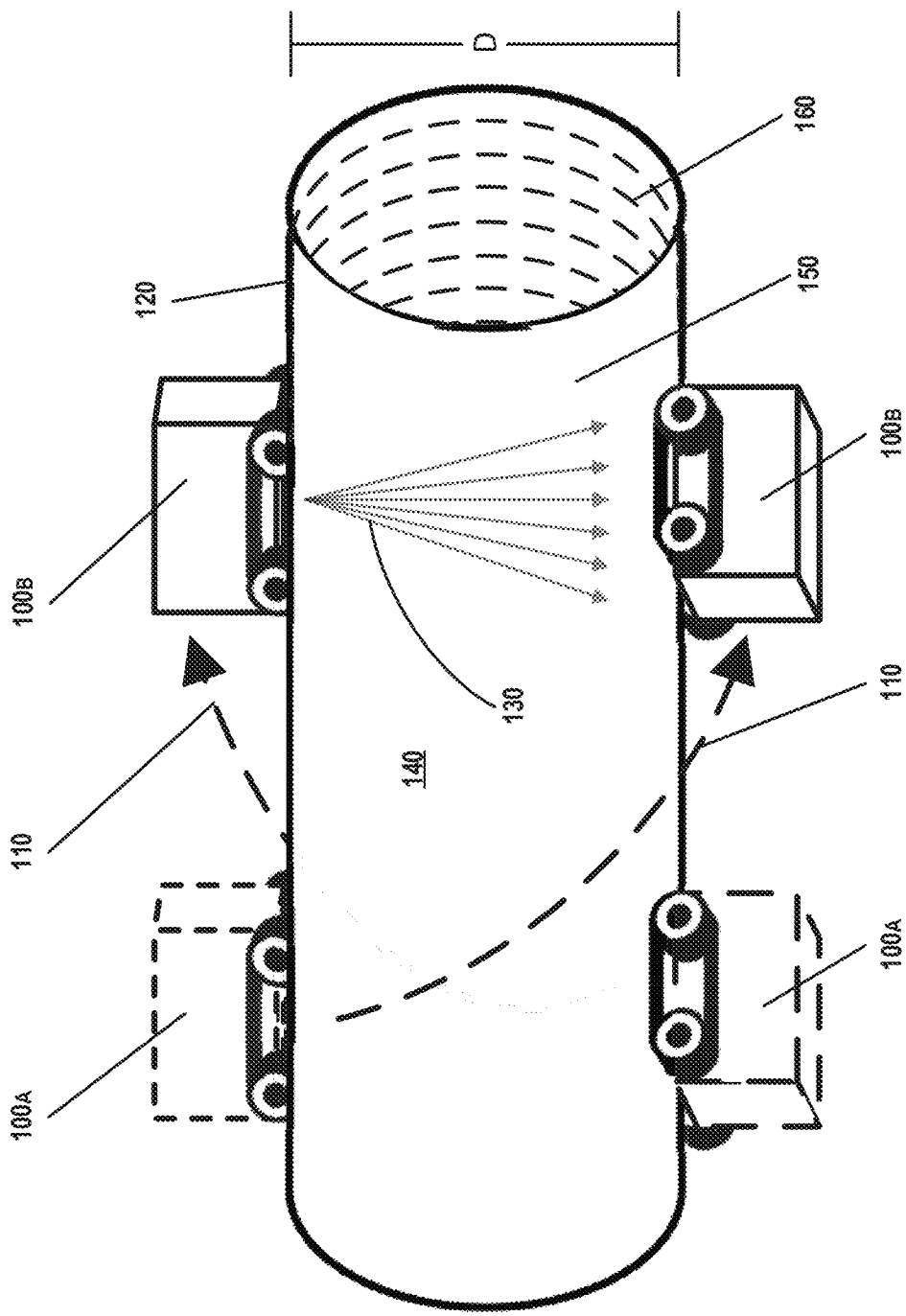
FIG. 7 shows an application of hydrate controller devices on a tube in accordance with one or more embodiments.

FIG. 7 shows a pair of the hydrate controller devices such as those described in FIGS. 1-4 and 5. The hydrate controlling devices follow a helical path 110 on an exterior surface 120 of a tube 150. The hydrate controlling devices move forward and to a side from previous location 100A to a current location 100B. While the hydrate controller devices move to the current location 100B, one of the hydrate controller devices may generate acoustic signals 130 to the other hydrate controller devices to perform the imaging and information gathering, and to resonate the inside of the tube 140 as described in FIGS. 1-4. These acoustic signals 130 are generated from one hydrate controller device to its counterpart in a parallel plane at a diametrically opposite location of the diameter D of the tube 150. The acoustic signals 130 may be used to detect or detach any hydrate droplets formed or sediment accumulated on an interior surface of the tube 150. By moving in circular way and they send and receive sound signal from the opposite car. These signals are processed using computer software to images of inside the pipe using plotting processes, such as multiphase metering. Similarly, acoustic tomography may be used for hydrate mapping. The hydrate mapping may depend on a stress (i.e., pressure) in the tube and type of the media (i.e., inside the tube). For example, a velocity of propagation of the acoustic signals may be higher in hydrates (i.e., a solid medium) than in liquids and gas. As such, slowing down in velocity of propagation may be an indication of hydrate formation. As a reference, the sound in ice is around 4000 m/s. Thus, acoustic signals going through hydrates may be around 4000 m/s in velocity. Alternatively, acoustic signals going through gas or liquid may, reach lower velocities between 450 m/s to 470 m/s.

Testing for sound velocity in meters per second (m/s) may be appreciated in Table 1 for mediums including crude oil, brine, hydrocarbon gas, and ice.

TABLE 1

| Medium | Sound Velocity, meter per second (m/s) |
| --- | --- |
| Ice | ~4000 |
| Crude oil | 1200-1250 |
| Brine | 1550-1600 |
| Hydrocarbon Gas | 450-470 |

The right frequency and location of the acoustic should be considered and evaluated for the tube before deploying the hydrate controller devices. For example, to prevent the acoustic signals from affecting the rest of the tube (i.e., seals or connectors) sound frequencies used in the acoustic signals may be evaluated through testing to pick right frequencies for transmitting the signals and for resonating the tube.

Figure 8:
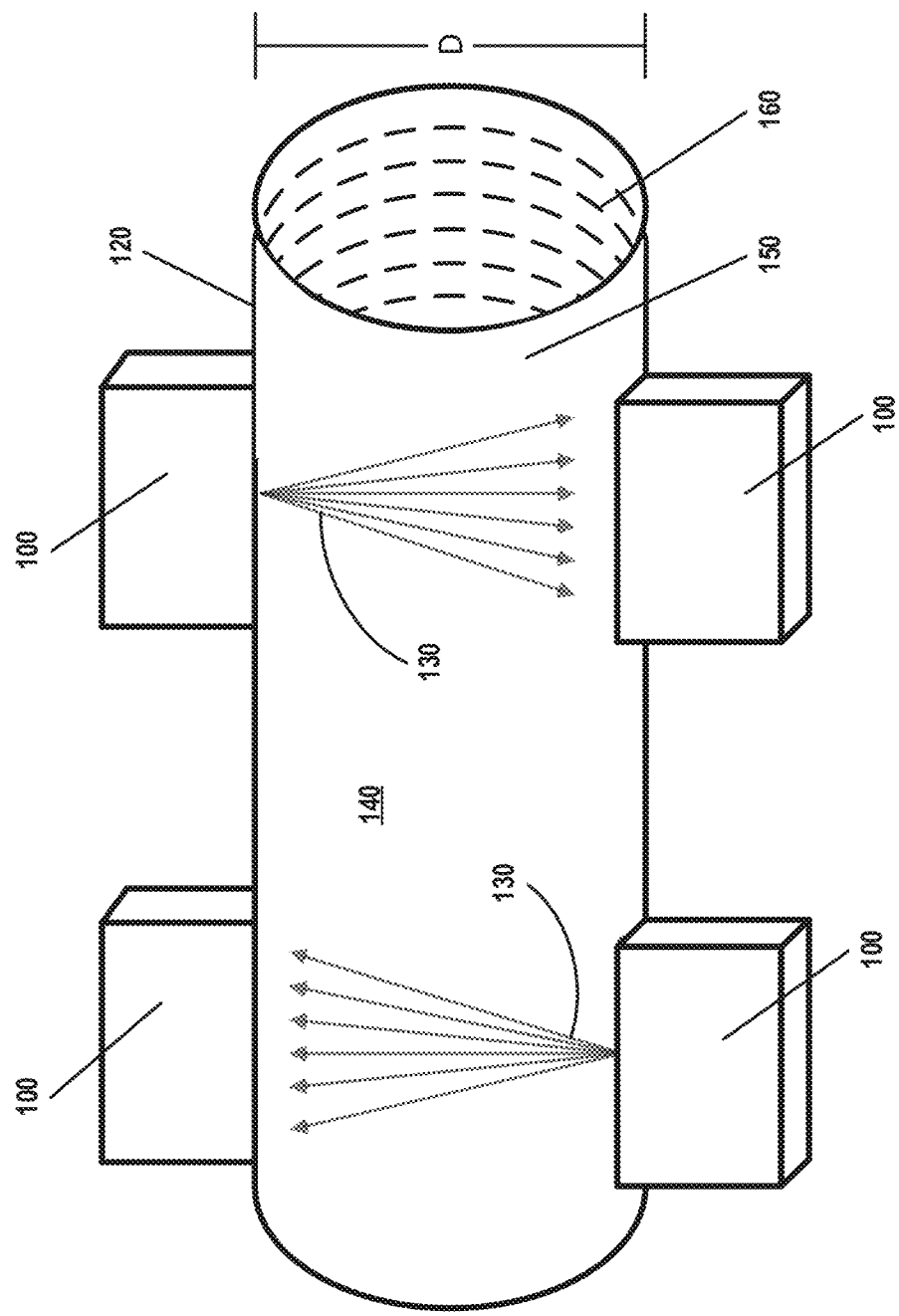
FIG. 8 shows an application of hydrate controller devices on a tube in accordance with one or more embodiments.

FIG. 8 shows a pair of the hydrate controller devices such as those described in FIGS. 1-4 and 7. The hydrate controlling devices may be disposed on parallel planes in a section of a tube. Each hydrate controller device may be fixed at an interval and may propagate acoustic signals 130 to resonate the inside of the tube 140. When the hydrate controller devices detect obstructions formed within the tube 150, hydrates may be detached by a destabilization propagation from vibration of acoustic signals 130 on the exterior surface 120. In accordance with some embodiments disclosed herein, the hydrate controller devices may propagate acoustic signals 130 continuously without detecting operation in order to maintain the area free of obstructions.

While FIGS. 1-8 show various configurations of components, other configurations may be used without departing from the scope of the disclosure. For example, various components in FIGS. 1-8 may be combined to create a single component. As another example, the functionality performed by a single component may be performed by two or more components.

Figure 9:
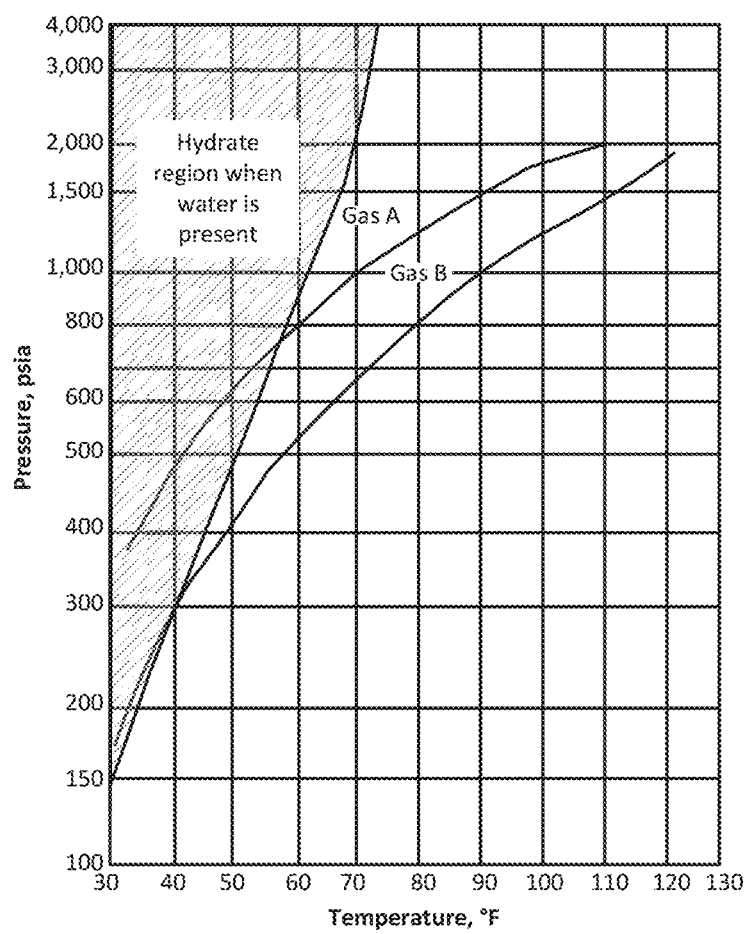
FIG. 9 shows a hydrate formation prediction graph in accordance with one or more embodiments.
Figure 10:
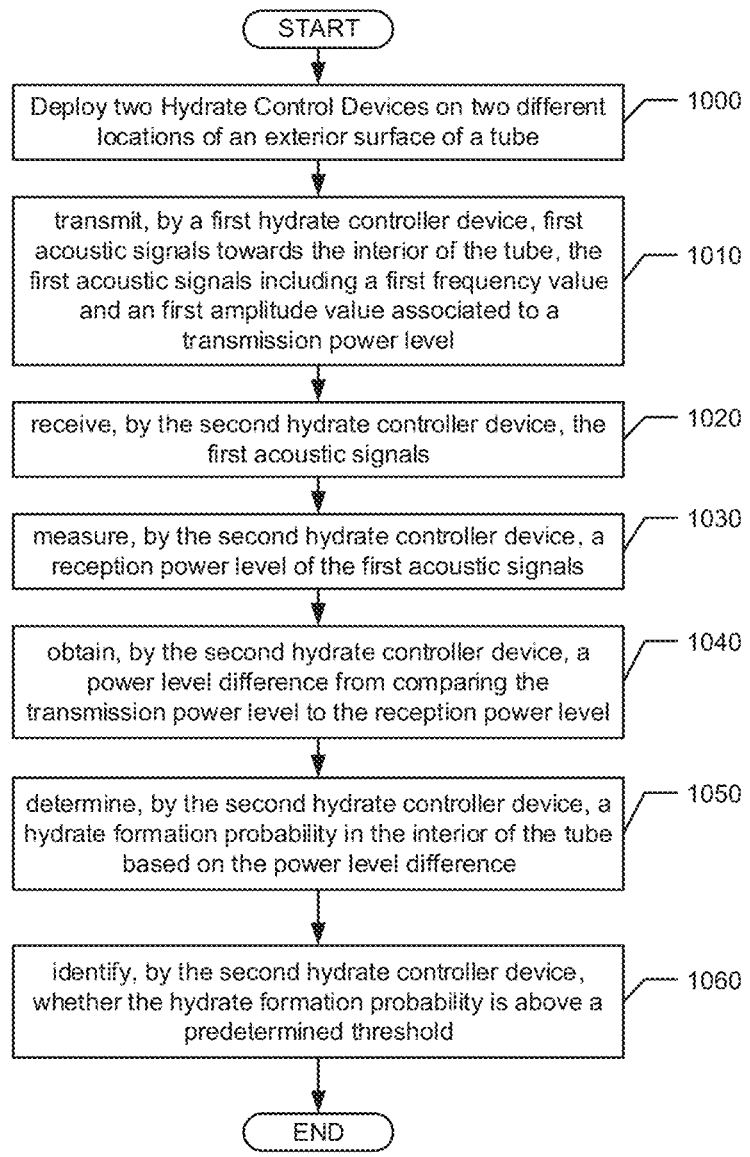
FIG. 10 shows a flowchart in accordance with one or more embodiments.

FIG. 9 shows a graph including changes of temperature as a pressure increases. The graph may serve as a hydrate formation prediction for natural gases as a function of the temperature and the pressure. Temperature changes in natural gas pipe lines physically forms ice crystalline water-based solids (i.e., hydrates), causing blockage and slow down or shutdown production as described above. The formation takes place when the temperature drops less than 70° F. with respect to pressure increase as seen in FIG. 9.

FIG. 11 shows a flowchart illustrating a method monitoring hydrate formation in an interior of a tube. For example, one or more pairs of hydrate controller devices may be deployed for collecting imaging data relating to the interior of a tube. The inside of the tube may be evaluated, monitored, and mapped to determine the presence of sediments or hydrates. The inside of the tube may then be resonated to a specific frequency to detach sediment and hydrates, as described with respect to FIGS. 1-9.

In block 1000, two hydrate controller devices may be deployed at two different locations on an exterior surface of the tube. As described in reference to FIGS. 1-9, the hydrate controller devices are positioned on planes parallel to one another on an exterior surface of a tube. The first hydrate controller device and the second hydrate controller device may start a traversal path moving forward and towards a side while maintaining a predetermined distance, the predetermined distance being equal to the predetermined diameter of the tube. The second hydrate controller device may determine whether the distance is equal to the predetermined distance. The first hydrate controller device and the second hydrate controller device may stop the traversal path when the distance is not equal to the predetermined distance. The first hydrate controller device and the second hydrate controller device may continue the traversal path when the distance is equal to the predetermined distance. The second hydrate controller device determines a hydrate formation probability in the interior of the tube based on a power level difference and a distance difference.

In block 1010, a first hydrate controller device may transmit acoustic signals towards the interior of the tube. The acoustic signals include a first frequency value and a first amplitude value associated with a transmission power level. Upon identifying hydrates or sediment inside the tube, the first hydrate controller device transmits second acoustic signals towards the interior of the tube. The second acoustic signals include a second frequency value and a second amplitude value. The second acoustic signals resonate the interior of the tube using the second acoustic signals.

In block 1020, another hydrate controller device may receive the first acoustic signals. The second hydrate controller device may obtain a distance difference from comparing the distance to a predetermined diameter of the tube.

In Block 1030, the second hydrate controller device may measure a reception power level of the first acoustic signals. The second hydrate controller device may determine a distance between the first hydrate controller device and the second hydrate controller device based on the reception power level measured. The second hydrate controller device determines the hydrate formation probability in the interior of the tube based on a power level difference.

In Block 1040, the second hydrate controller device may obtain a power level difference from comparing the transmission power level to the reception power level. The second hydrate controller device identifies whether the hydrate formation probability is above a predetermined threshold.

In Block 1050, the second hydrate controller device may determine a hydrate formation probability in the interior of the tube based on the power level difference. The second hydrate controller device may transmit imaging information to the first hydrate controller device. The imaging information includes the power level difference, the hydrate formation probability, and the distance.

In Block 1060, the second hydrate controller device may identify whether the hydrate formation probability is above a predetermined threshold. The first hydrate controller device or by the second hydrate controller device may transmit geospatial information and the imaging information to control system located in a remote location. The first hydrate controller device or by the second hydrate controller device or by the control system may generate a mapping of the interior of the tube at a point in time based on the imaging information received.

In FIGS. 11.1 and 11.2, embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 11.1, the computing system 1100 may include one or more computer processor(s) 1104, non-persistent storage 1102 (e.g., random access memory (RAM), cache memory, flash memory, etc.), one or more persistent storage (1106) (e.g., a hard disk, an optical drive such as a compact disk (CD) drive or digital versatile disk (DVD) drive, a flash memory stick, etc.), and numerous other elements and functionalities. The computer processor(s) 1104 may be an integrated circuit for processing instructions. For example, the computer processor(s) 1104 may be one or more cores, or micro-cores of a processor. The computing system 1100 may also include one or more input device(s) 1120, such as a touchscreen, keyboard, mouse, microphone, touchpad, electronic pen, or any other type of input device. Further, the computing system 1100 may include one or more output device(s) 1110, such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system 1100 may be connected to a network system 1130 (e.g., a local area network (LAN), a wide area network (WAN) such as the Internet, mobile network, or any other type of network) via a network interface connection (not shown). Many different types of computing systems exist, and the aforementioned input and output device(s) may take other forms.

The computing system 1100 in FIG. 11.1 may be connected to or be a part of a network. For example, as shown in FIG. 11.2, the network system 130 may include multiple nodes (e.g., node 1132*a*, node 1132*n*). Each node may correspond to a computing system, such as the computing system shown in FIG. 11.1, or a group of nodes combined may correspond to the computing system shown in FIG. 11.1. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system 1100 my be located at a remote location and connected to the other elements over a network.

The nodes (e.g., node 1132*a*, node 1132*n*) in the network system 1130 may be configured to provide services for a client device 1140. For example, the nodes may be part of a cloud computing system. The nodes may include functionality to receive requests from the client device 1140 and transmit responses to the client device 1140. The client device 1140 may be a computing system, such as the computing system shown in FIG. 11.1. Further, the client device 1140 may include and/or perform all or a portion of one or more embodiments of the disclosure.

The computing system or group of computing systems described in FIGS. 11.1 and 11.2 may include functionality to perform a variety of operations disclosed herein. For example, the computing system(s) may perform communication between processes on the same or different systems. A variety of mechanisms, employing some form of active or passive communication, may facilitate the exchange of data between processes on the same device.

The computing system in FIG. 11.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The computing system of FIG. 11.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

The above description of functions presents only a few examples of functions performed by the computing system of FIG. 11.1 and the nodes and/or client device in FIG. 11.2. Other functions may be performed using one or more embodiments of the disclosure.

While the invention has been described with respect to a limited number of embodiments, those skilled in the art, having the benefit of this disclosure, will appreciate that other embodiments can be devised that do not depart from the scope of the invention as described herein. Accordingly, the scope of the invention should be limited only by the accompanying claims.

What is claimed is:

1. A method for monitoring hydrate formation in an interior of a tube, the method comprising:
   deploying a first hydrate controller device at a first location on an exterior surface of the tube;
   deploying a second hydrate controller device at a second location on the exterior surface of the tube;
   transmitting, by the first hydrate controller device, first acoustic signals towards the interior of the tube, the first acoustic signals comprising a first frequency value and a first amplitude value associated to a transmission power level;
   receiving, by the second hydrate controller device, the first acoustic signals;
   measuring, by the second hydrate controller device, a reception power level of the first acoustic signals;
   obtaining, by the second hydrate controller device, a power level difference from comparing the transmission power level to the reception power level; and
   determining, by the second hydrate controller device, a hydrate formation probability in the interior of the tube based on the power level difference.

2. The method of claim 1, further comprising:
   identifying, by the second hydrate controller device, whether the hydrate formation probability is above a predetermined threshold.

3. The method of claim 1, further comprising:
   generating, by the first hydrate controller device, second acoustic signals towards the interior of the tube, the second acoustic signals comprising a second frequency value and a second amplitude value; and
   resonating the interior of the tube using the second acoustic signals.

4. The method of claim 1, further comprising:
   determining, by the second hydrate controller device, a distance between the first hydrate controller device and the second hydrate controller device based on the reception power level measured;
   obtaining, by the second hydrate controller device, a distance difference from comparing the distance to a predetermined diameter of the tube; and
   determining, by the second hydrate controller device, the hydrate formation probability in the interior of the tube based on the power level difference and the distance difference.

5. The method of claim 4, further comprising:
   transmitting, by the second hydrate controller device, imaging information to the first hydrate controller device, the imaging information comprising the power level difference, the hydrate formation probability, and the distance.

6. The method of claim 5, further comprising:
starting, by the first hydrate controller device and the second hydrate controller device, a traversal path moving forward and towards a side while maintaining a predetermined distance, the predetermined distance being equal to the predetermined diameter of the tube.

7. The method of claim 6, further comprising:
determining, by the second hydrate controller device, whether the distance is equal to the predetermined distance; and
stopping, by the first hydrate controller device and the second hydrate controller device, the traversal path when the distance is not equal to the predetermined distance.

8. The method of claim 6, further comprising:
determining, by the second hydrate controller device, whether the distance is equal to the predetermined distance; and
continuing, by the first hydrate controller device and the second hydrate controller device, the traversal path when the distance is equal to the predetermined distance.

9. The method of claim 5, further comprising:
transmitting, by the first hydrate controller device or by the second hydrate controller device, geospatial information and the imaging information to control systems located in a remote location.

10. The method of claim 9, further comprising:
generating, by the first hydrate controller device or by the second hydrate controller device or by the control systems, a mapping of the interior of the tube at a point in time based on the imaging information received.

11. The method of claim 1, wherein the tube is a section of a pipeline or a section of a wellbore tubular.

12. A system for monitoring hydrate formation in an interior of a tube, comprising:
a first hydrate controller device deployed at a first location on an exterior surface of the tube; and
a second hydrate controller device deployed at a second location on the exterior surface of the tube;
wherein the first hydrate controller device:
transmits first acoustic signals towards the interior of the tube, the first acoustic signals comprising a first frequency value and a first amplitude value associated to a transmission power level,
wherein the second hydrate controller device:
receives the first acoustic signals,
measures a reception power level of the first acoustic signals,
obtains a power level difference from comparing the transmission power level to the reception power level, and
determines a hydrate formation probability in the interior of the tube based on the power level difference.

13. The system of claim 12, wherein the second hydrate controller device further identifies whether the hydrate formation probability is above a predetermined threshold.

14. The system of claim 12, wherein:
the first hydrate controller device further generates second acoustic signals towards the interior of the tube, the second acoustic signals comprising a second frequency value and a second amplitude value; and
the second acoustic signals resonate the interior of the tube.

15. The system of claim 12, wherein the second hydrate controller device further:
determines a distance between the first hydrate controller device and the second hydrate controller device based on the power level difference;
obtains a distance difference from comparing the distance to a predetermined diameter of the tube; and
determines the hydrate formation probability inside of the tube based on the power level difference and a result of the distance difference.

16. The system of claim 15, wherein the first hydrate controller device and the second hydrate controller device further:
start a traversal path moving forward and towards a side while maintaining a predetermined distance, the predetermined distance being equal to the predetermined diameter of the tube.

17. The system of claim 16,
wherein the second hydrate controller device further determines whether the distance is equal to the predetermined distance;
wherein the first hydrate controller device and the second hydrate controller device further:
stop the traversal path when the distance is not equal to the predetermined distance; and
continue the traversal path when the distance is equal to the predetermined distance.

18. The system of claim 12, wherein the tube is a section of a pipeline or a section of a wellbore tubular.

19. A hydrate controller device deployed at a first location on an exterior surface of a tube for monitoring hydrate formation in an interior of the tube, the hydrate controller device comprising:
sensing systems that receive acoustic signals from a second hydrate controller device deployed at a second location on the exterior surface of the tube;
wherein the second hydrate controller device transmits the acoustic signals towards the interior of the tube, and
wherein the acoustic signals comprise a first frequency value and a first amplitude value associated to a transmission power level;
processing systems that measure a reception power level of the acoustic signals, obtain a power level difference from comparing the transmission power level to the reception power level, and determine a hydrate formation probability in the interior of the tube based on the power level difference.

20. The hydrate controller device of claim 19, wherein the tube is a section of a pipeline or a section of a wellbore tubular.

* * * * *